United States Patent Office 3,247,070
Patented Apr. 19, 1966

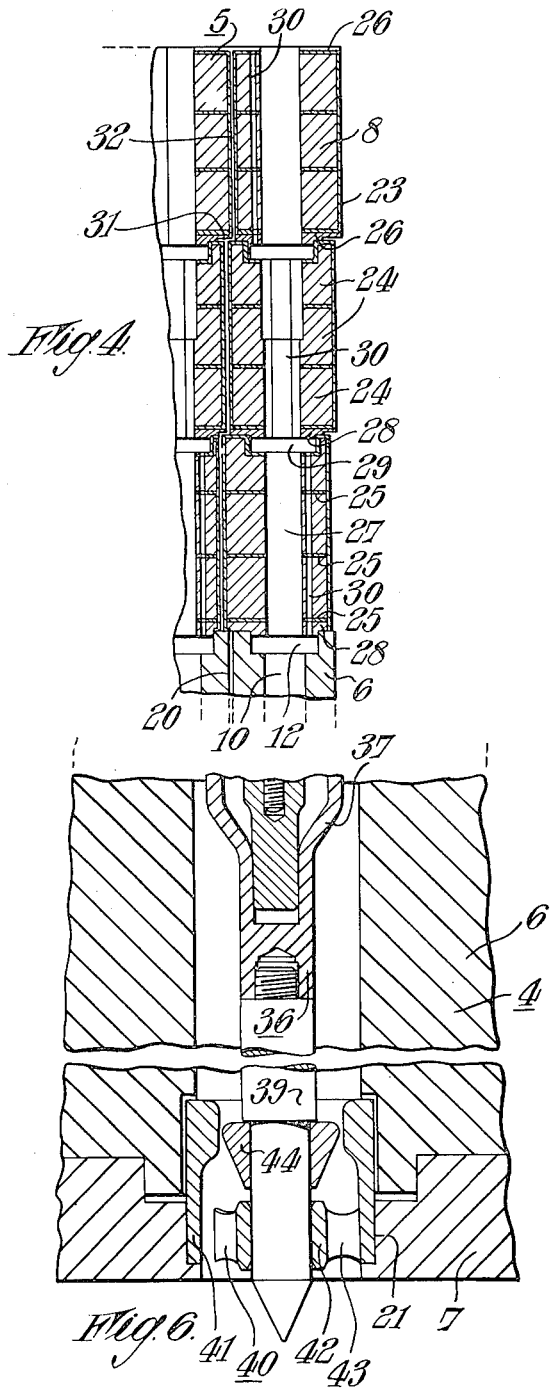

3,247,070
MODERATOR STRUCTURES FOR NUCLEAR REACTORS INCLUDING A UNITARY HEADER TANK
Ronald Scott Challender, Appleton, near Warrington, and Dennis Ross Poulter, Culcheth, Warrington, England, assignors to United Kingdom Atomic Energy Authority, London, England
Continuation of application Ser. No. 744,207, June 24, 1958. This application Jan. 10, 1963, Ser. No. 250,597
Claims priority, application Great Britain, June 24, 1957, 19,896/57
3 Claims. (Cl. 176—30)

The present application for patent is a continuation of patent application Serial No. 744,207, filed June 24, 1958, now abandoned.

This invention relates to nuclear reactors and it has an application in the sodium-graphite reactor disclosed in detail in a co-pending application Serial No. 744,185, now issued as U.S. Letters Patent No. 3,000,728, of even date filed in the names of Everett Long and Ronald Scott Challender and of common assignee.

According to the present invention a moderator structure for a nuclear reactor comprises vertical columns of graphite blocks spaced to provide vertical passageways through the structure, the columns having means providing for their location independent of one another and means defining coolant channels passing lengthwise through the columns.

The structure of the invention allows for thermal and irradiation growth of the columns in all directions without creating undue stressing of the structure; it also allows free growth at one end (normally the hot end) in excess of that at the other end (normally the cold end); it also allows for the graphite structure to be cooled by a coolant passed through the pasageways, the heat extracted being usefully employed, whilst providing that the lower neutron energy level consequent upon the lower moderator temperature improves the nuclear properties of the reactor in the course of its operation. Problems of differential thermal expansion as between the graphite and other materials (such as steel supports) are avoided or substantially reduced.

The above structure is particularly useful in a re-entrant cooled design of sodium-graphite reactor where the outer (or thimble) tube of the re-entrant system is supported at the lower end of the graphite structure and is readily located with feed tubes at the top of the reactor. A space is left between the thimble tube and the moderator structure so that further cooling of the moderator can take place.

One embodiment of the invention will now be described by way of example with reference to the accompanying drawing in which:

FIG. 4 is an enlarged detail of a neutron shield forming part of the structure of FIG. 1.

FIG. 6 is an enlarged detail of the lower part of FIG. 5.

Figure 1:
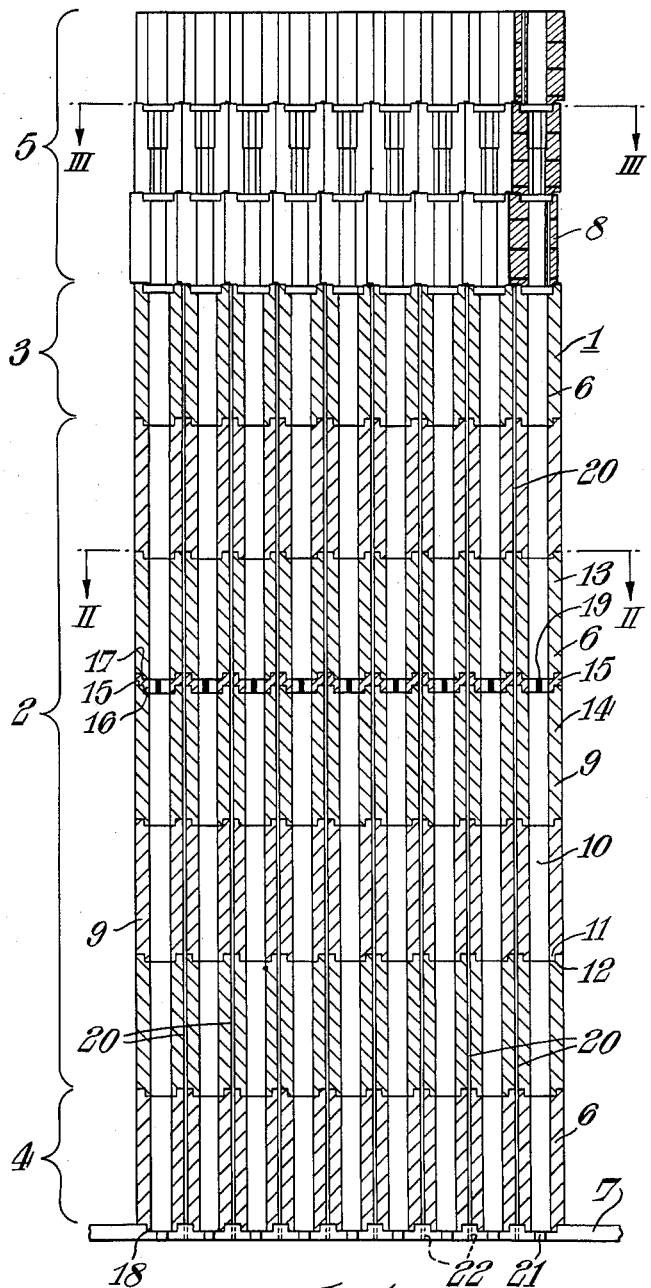
FIG. 1 is a vertical sectional elevation of a moderator structure.

In FIG. 1 there is shown in general outline a moderator structure 1 comprising a core region 2 and upper and lower reflector regions 3 and 4 surmounted by an upper neutron shield 5. The upper and lower reflector regions 3 and 4 each comprises a layer of spaced hexagonal cross-section graphite blocks 6, the blocks 6 of the lower reflector region 4 resting on a perforated core plate 7. The core region 2 comprises a further five layers of graphite bricks 6 and the neutron shield 5 comprises regions 3 and 4 each comprises a layer of spaced hexagonal cross-section. The blocks 6 form vertical columns 9 and are formed to define vertical channels 10 passing through the structure 1. The columns of blocks 6 forming the structure 1 are spigotted together, spigots 11 formed on the blocks 6 of any layer engaging with spigot holes 12 in the blocks 6 of lower adjacent layers, excepting two central layers 13 and 14 of blocks 6 which are separated by a layer of spaced hexagonal tiles 15 having spigots 16 and spigot holes 17 respectively similar to the spigots 11 and the spigot holes 12 of the blocks 6. The spigots 11 of the blocks 6 forming the lower reflector region 4 engage with spigot holes 18 formed in the core plate 7. The tiles 15 are formed to preserve the continuity of the channels 10 and have three equally spaced internal projections 19.

Figure 2:
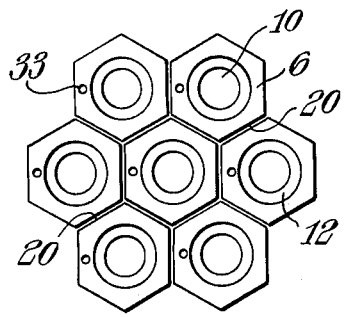
FIG. 2 is a sectional plan along the line II—II of FIG. 1.

As shown in FIG. 2 the blocks 6 of the core region 2 and the upper and lower reflector regions 3 and 4 are spaced apart face to face thus defining vertical passageways 20 through the structure 1. The core plate 7 has drillings 22 connecting with the passageways 20.

Figure 3:
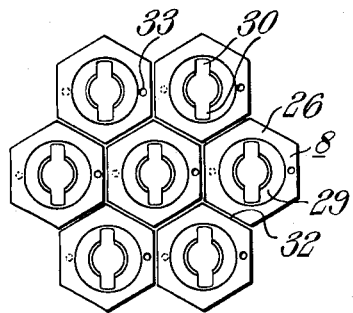
FIG. 3 is a sectional plan along the line III—III of FIG. 1.

Referring to FIGS. 3 and 4 in conjunction with FIG. 1, the neutron shield 5 is formed from composite steel canned graphite bricks 8. The bricks 8 comprise a hexagonal mild steel can 23 containing three sections of graphite 24 separated by boron steel shims 25. The can 23 is closed top and bottom by boron steel end plates 26. The neutron shield 5 is built up from three layers of the bricks 8, each layer being staggered in relationship to lower layers. The bricks 8 are formed to define extensions 27 of the channels 10 but of smaller diameter. The bricks 8 have short spigots 28 engaging with spigot holes 29 in the bricks 8 of adjacent lower layers while the spigots 28 of the bottom layer of bricks 8 engage with the spigot holes 12 in the bricks 6 of the upper reflector region 3. Each of the bricks 8 has two diametrically opposed internal longitudinal chases 30 and the radial position of the chases 30 is staggered by 60° in consecutive layers of the bricks 8 to obviate vertical gaps in the neutron shield 5. As shown in FIGS. 3 and 4 the bricks 8 are spaced apart face to face thus defining, with cut away parts 31 of the bricks 8, a staggered passageway 32 through the neutron shield 5 connecting with the passageways 20. The bricks 6 are additionally coupled together by pegs 33.

Figure 5:
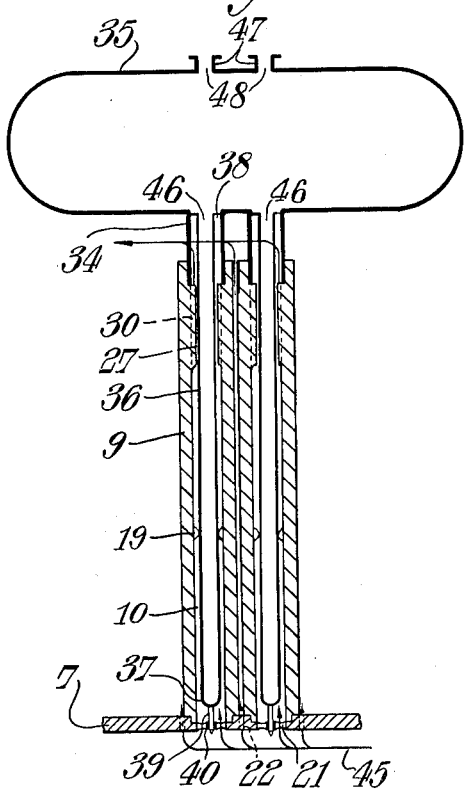
FIG. 5 is a schematic sectional elevation of a moderator structure fitted with a re-entrant cooling system.

As shown in FIG. 5 each column 9 of graphite blocks (6 and 8) is located by spigot tubes 34 projecting from a sodium header tank 35 and by the core plate 7. The spigot tubes 34 define lower fuel servicing apertures 46 in the tank 35. The tank 35 also has fuel servicing stand pipes 47 defining upper fuel servicing apertures 48, each aperture being in line with one of the channels 10 and one of the apertures 46. FIG. 5 shows zirconium thimble tubes 36 forming part of a re-entrant cooling system in which liquid sodium is passed from the sodium header tank 35 through annular spaces between the zirconium tubes 36 and concentric inner tubes (not shown) and thence through the inner tubes over fuel elements contained. The zirconium tubes 36 have a lower closed end 37 and pass through the channels 10 and their extensions 27. The zirconium tubes 36 are sealed at their upper ends 38 in the spigot tubes 34 and are located at their lower closed ends by pegs 39 engaging with spiders 40 carried by the core plate 7 within drillings 21. The tubes 36 are intermediately located in the channels 10 by the projections 19 of the tiles 15.

Referring to FIG. 6 there is shown part of the core plate 7 and one of the spiders 40 comprising a cylindrical body 41 fitted into one drilling 21 of the core plate 7 with a central boss 42 located by three integral spider legs 43. The peg 39 which is screwed into the closed end 37 of the zirconium tube 36 is fitted with a flow restrictor 44 in the form of a tapered ring. In operation of the reactor, gaseous coolant for the graphite (as indicated by the arrows 45 in FIG. 5) is fed through the drillings 21 in the core plate 7, through the annular spaces between the walls of the channels 10 and the zirconium tubes 36, through the chases 30 and thence out through the spigot tubes 34. Gaseous coolant is also fed through the passageways 20 and thence out of the structure 1 through the staggered passageways 32 in the neutron shield 5.

The direction of minimum Wigner growth of the graphite in the graphite blocks 6 is arranged longitudinally thereof and the passageways 20 and 32 are made of sufficient width to accommodate lateral Wigner growth whilst still allowing the passage of a coolant.

Differential thermal movements between the sodium tank 35 and the core plate 7 is accommodated by tilting of the columns 9 which can be tolerated. The spigot tubes 34 provide that alignment is maintained between each of the channels 10 and its associated pair of apertures 46, 48 for fuel servicing purposes (fuel servicing being fully described in the above-mentioned co-pending application Serial No. 744,185 now U.S. Patent No. 3,000,728).

We claim:

1. A nuclear reactor moderator structure comprising a plurality of upright graphite columns, said columns defining channels for fuel elements and coolant, the channels extending in the direction of the columns, a base plate disposed below said columns, a unitary header tank disposed above said columns and defining fuel element servicing apertures, means keying the lower end of each column to said base plate, and spigot tube connections between said tank and said channels at the upper ends of the columns, each connection aligning one of said apertures with one of said channels.

2. A nuclear reactor moderator structure comprising a plurality of upright graphite columns, said columns defining channels for fuel elements and coolant, said channels extending in the direction of the columns, a base plate disposed below said columns, a unitary header tank disposed above said columns, said tank having fuel servicing apertures, means keying the lower end of each column to said base plate, and spigot tube connections between said tank and said channels at the upper ends of the columns, each connection comprising a spigot tube disposed around one of the apertures and projecting downwardly to engage the upper end of one of the columns thereby aligning said one of the apertures with one of said channels.

3. A nuclear reactor moderator structure comprising a plurality of upright columns of graphite blocks, said columns defining channels for fuel elements and coolant, said channels extending in the direction of the columns, a base plate disposed transversely of the direction of and below said columns, first means keying the lower-most block of each of the columns to said base plate, second means keying the blocks of each column to adjacent blocks in said column, a unitary header tank disposed transversely of the direction of and above said columns, said tank having pairs of aligned fuel servicing apertures, each pair being associated with one of said channels, and spigot tube connections between the tank and the channels in the uppermost blocks of the columns, each connection comprising a spigot tube disposed round the lower-most one of each pair of aligned fuel servicing apertures and aligning that pair with its associated channel, and said first and second means and spigot tube connections serving to space said columns apart to define moderator coolant passageways extending in the direction of the columns.

References Cited by the Examiner

UNITED STATES PATENTS

| 2,898,280 | 8/1959 | Schultz | 176—78 |
| 3,010,888 | 11/1961 | Battle | 176—84 |

OTHER REFERENCES

Parkins: Proceedings of the International Conference on the Peaceful Uses of Atomic Energy, volume 3, 1955, pages 295–310, TK 9006 I5.

Starr: Proceedings of the International Conference on the Peaceful Uses of Atomic Energy, volume 3, 1955, pages 98–109, TK 9006 I5.

REUBEN EPSTEIN, *Primary Examiner.*

CARL D. QUARFORTH, *Examiner.*